United States Patent
Engelhardt et al.

(10) Patent No.: US 7,124,040 B2
(45) Date of Patent: Oct. 17, 2006

(54) METHOD OF MONITORING A FUEL CELL UNIT

(75) Inventors: Thorsten Engelhardt, Wildeck-Hoenebach (DE); Richard Fosmoe, Sacramento, CA (US); Wolfgang Weiss, Gold River, CA (US)

(73) Assignee: DaimlerChrysler AG, Stuttgart (DE)

( * ) Notice: Subject to any disclaimer, the term of this patent is extended or adjusted under 35 U.S.C. 154(b) by 5 days.

(21) Appl. No.: 10/938,851

(22) Filed: Sep. 13, 2004

(65) Prior Publication Data
US 2005/0106426 A1    May 19, 2005

(30) Foreign Application Priority Data
Sep. 12, 2003  (DE) ................. 103 42 146

(51) Int. Cl.
*G01R 31/00*   (2006.01)
(52) U.S. Cl. ............... 702/58; 702/58; 702/59; 702/60; 702/61
(58) Field of Classification Search ........... 702/58, 702/59–61; 429/12; 324/426, 433
See application file for complete search history.

(56) References Cited

U.S. PATENT DOCUMENTS

| | | | | |
|---|---|---|---|---|
| 3,294,586 A * | 12/1966 | Le Duc | ............ | 429/13 |
| 3,573,179 A * | 3/1971 | Dirth et al. | ............ | 205/336 |
| 5,170,124 A * | 12/1992 | Blair et al. | ............ | 324/434 |
| 5,539,318 A * | 7/1996 | Sasaki | ............ | 324/428 |
| 5,945,229 A * | 8/1999 | Meltser | ............ | 429/13 |
| 6,064,182 A * | 5/2000 | Eguchi | ............ | 320/132 |
| 6,215,272 B1 * | 4/2001 | Ohara et al. | ............ | 320/104 |
| 6,646,418 B1 * | 11/2003 | Xie et al. | ............ | 320/120 |
| 6,692,851 B1 * | 2/2004 | Keskula et al. | ............ | 429/13 |
| 6,847,188 B1 * | 1/2005 | Keskula et al. | ............ | 320/101 |
| 2002/0051899 A1 * | 5/2002 | Keskula et al. | ............ | 429/17 |

FOREIGN PATENT DOCUMENTS

| | | |
|---|---|---|
| DE | 43 38 178 A1 | 11/1993 |
| DE | 195 23 260 A1 | 6/1995 |
| WO | 91/19328 | 12/1991 |

* cited by examiner

*Primary Examiner*—Marc S. Hoff
*Assistant Examiner*—Phuong Huynh
(74) *Attorney, Agent, or Firm*—Crowell & Moring LLP

(57) ABSTRACT

In a method of monitoring a fuel cell unit, at least one pair of measured values, including a measured current value and a measured voltage value ($I_{actual}$, $U_{actual}$) are determined at the outputs of the fuel cell unit. The measured voltage value ($U_{actual}$) is compared with a limit value ($P_G$), which is a function of the measured current value ($I_{actual}$) by way of a limit characteristic polarization curve. It is concluded that the condition of the fuel cell unit is faulty when the measured voltage value ($U_{actual}$) or a function of the measured voltage value is smaller than or equal to a predefined threshold value.

19 Claims, 3 Drawing Sheets

METHOD OF MONITORING A FUEL CELL UNIT

BACKGROUND AND SUMMARY OF THE INVENTION

This application claims the priority of German patent document 103 42 146.7, filed Sep. 12, 2003, the disclosure of which is expressly incorporated by reference herein.

The invention relates to a method of monitoring a fuel cell unit for detecting defects therein.

German patent document DE 43 38 178 A1 discloses an arrangement for monitoring the condition of fuel cell units, in which the fuel cells are connected sequentially in at least two parallel switched rows, each having the same number of cells, and in which case, the rows are divided into branches of a bridge circuit and are connected with at least one analyzing arrangement. The latter evaluates the voltage or the current tapped between the branches and generates a fault report in the event of deviations beyond permissible limits.

Methods of monitoring fuel cell stacks are also known from German patent document DE 195 23 260 A1 and International patent document WO 91/19328. There, an average value is determined for the measured voltages of the cells, and compared with the individual voltages of the fuel cells. When an individual voltage is lower than the average value by a predefined amount, a corresponding warning is emitted. In German patent document DE 195 23 260 A1, the difference between the highest and the lowest individual voltage is also determined and a warning is emitted when it exceeds a predefined limit value.

One object of the invention is to provide a method of monitoring a fuel cell unit, by which a faulty condition of the fuel cell unit can be detected early, so that preventative maintenance measures can then be taken.

This and other objects and advantages are achieved by the method according to the invention, in which a measured voltage value determined at the outputs of the fuel cell unit, (as part of a pair of measured values consisting of a measured current value and a measured voltage value) is compared with a limit value which is a function of the measured current value associated with the voltage value. The functional relationship between the limit value and the measured current value is given by a limit characteristic polarization curve of the fuel cell unit. (Here, a fuel cell unit, also called a fuel cell stack, may be constructed of one or more fuel cells.)

In the following, the term "current" will also include quantities related to the current, such as a current density. Measured values in the following will include values actually measured by means of suitable sensors as well as values which are defined by an estimation method (for example, by means of a Luenberger Observer).

The so-called characteristic polarization curve reflects the technical condition of a fuel cell or fuel cell unit. The characteristic polarization curve describes the current-voltage characteristic of a fuel cell or of a fuel cell unit.

As an example, FIG. 1 shows such a characteristic polarization curve or current-voltage characteristic. The measured voltage U of the fuel cell unit is entered as a function over the current density S of the fuel cell unit. The characteristic polarization curve illustrated in FIG. 1 shows three characteristic ranges, through which a fuel cell unit can pass. The terminal voltage, which can be tapped at the fuel cell unit, is typically reduced by overvoltages when the circuit is closed. In the range of low current densities, a "pass-through overvoltage" limits the voltage by the finite speed of the charge transfer at the so-called three-phase limit and the adsorption and reaction of the particles. In an "activation range", this has the result that the voltage drops rapidly at low current densities. In the range of mean current densities, the resistance of the electrolyte and all other electron- and ion-conducting paths is responsible for a voltage drop which is largely linear with respect to the current density. In this range, normally called the "ohmic range", the voltage drops less rapidly with respect to the current density than in the activation range or in the "saturation range". In the saturation range at high current densities, the mass transfer effects—for example, concentration gradients because of an insufficiently fast diffusion of the reacting gases through pores or of the ions through the electrolyte—limit the characteristic polarization curve. The working range of a fuel cell or of a fuel cell unit is typically within the ohmic range.

The characteristic polarization curve represents a macroscopic description of the fuel cell unit. Microscopic effects, such as local current flows within individual cells, can be taken into account by an additional detailed modeling, for example, by means of the least error square and/or neuronal networks method. Detailed physical and/or chemical models can also be used which also model the local effects, such as the current distribution, the temperature distribution.

The characteristic polarization curve is used as a parameter function which describes the macroscopic condition of the fuel cell unit. Reversible and/or irreversible effects, such as contaminations, chemical and/or physical effects (for example, deposits, decompositions, erosions, dirt) have an indirect or direct influences on the course/the shape of the characteristic polarization curve. As a result, the characteristic polarization curve for one and the same unit is variable.

As an example, FIG. 2 shows a first characteristic polarization curve $P_N(I)$ and a second characteristic polarization curve $P_G(I)$ over the current I. The first characteristic polarization curve $P_N(I)$ (also called the "starting" characteristic polarization curve) describes the starting or new condition and/or the ideal condition of the fuel cell unit. The second characteristic polarization curve $P_G(I)$ (referred to as a limit characteristic polarization curve) describes the condition of the fuel cell unit starting from which the fuel cell unit is considered faulty and a repair becomes necessary. With respect to the voltage values, the limit characteristic polarization curve for the same current values is below the starting characteristic polarization curve. Deterioration is illustrated in FIG. 2 by an arrow.

The method according to the invention relates measured actual flow and voltage values to the limit characteristic polarization curve. On the basis of the actual values of current and voltage, a conclusion is drawn concerning the condition of the fuel cell unit. In a further embodiment of the invention, the relationship between the measured values and the starting characteristic polarization curve is also taken into account.

The method according to the invention has the advantage that the technical condition of the fuel cell unit can be continuously described and monitored. A diagnosis of the fuel cell unit is carried out, and even fast deteriorations and faults in the operating characteristics of the fuel cell unit can be detected early. A maintenance of the fuel cell unit can therefore be planned early and can already be carried out preventively.

The method according to the invention can be easily integrated in an analyzing unit, such as a control unit, and requires little storage space.

Other objects, advantages and novel features of the present invention will become apparent from the following detailed description of the invention when considered in conjunction with the accompanying drawings.

DETAILED DESCRIPTION OF THE DRAWINGS

In the figures, identical reference numbers indicate the same quantities.

Figure 1:
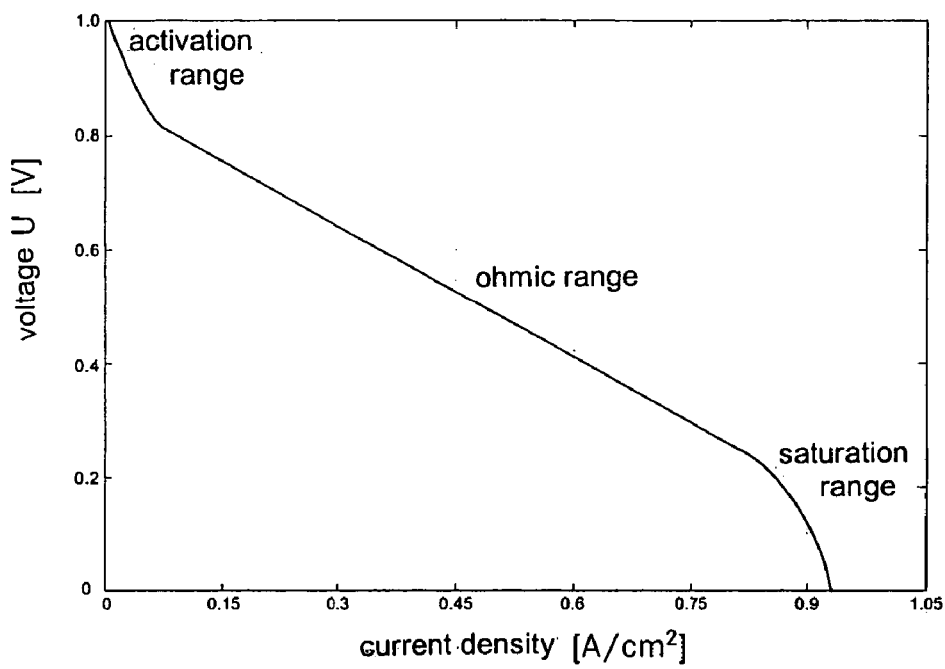
FIG. 1 is an example of a characteristic polarization curve of a fuel cell unit.
Figure 2:
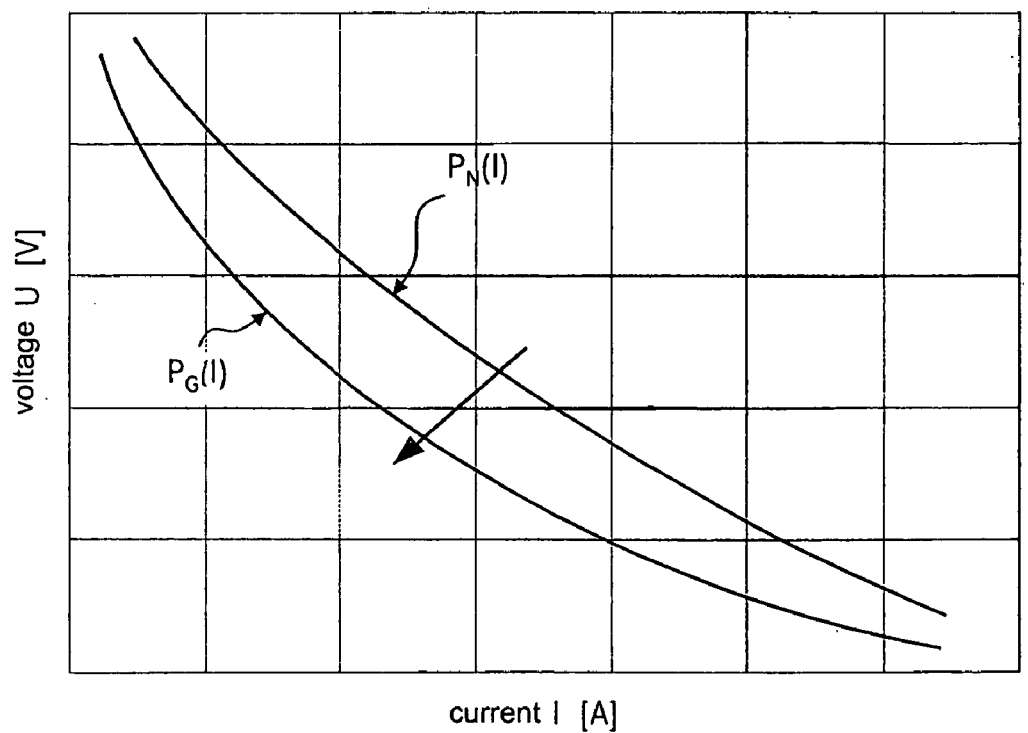
FIG. 2 shows examples of a starting characteristic polarization curve and of a limit characteristic polarization curve of a fuel cell unit.
Figure 3:
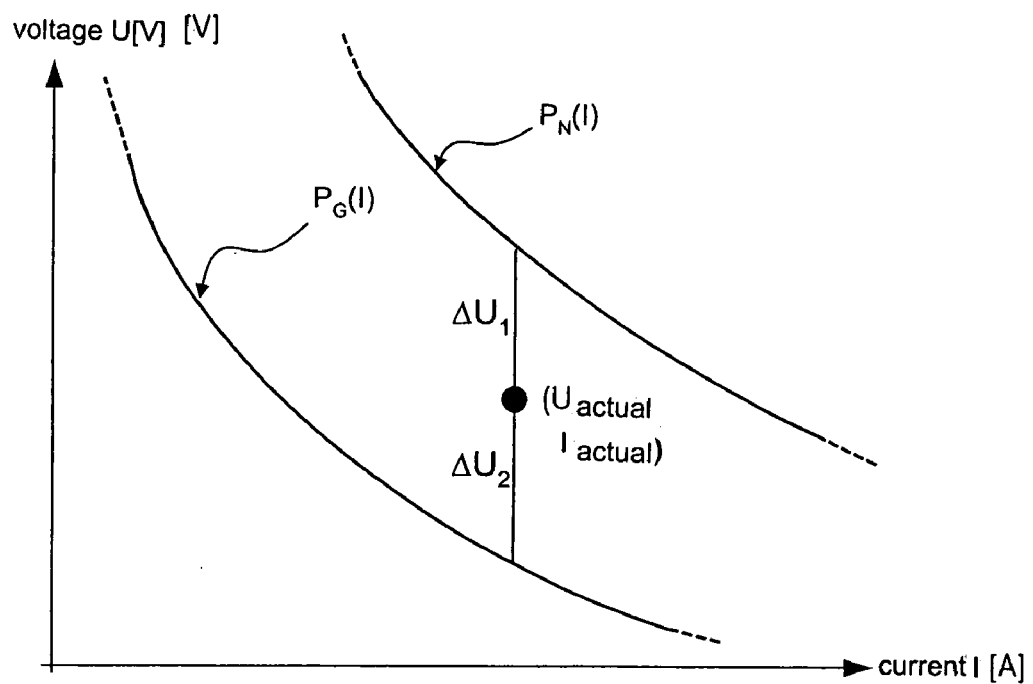
FIG. 3 is a graphic representation in which a pair of measured values consisting of a measured voltage value and a measured current value are related to a starting characteristic polarization curve and to a limit characteristic polarization curve.

As FIG. 2, FIG. 3 illustrates a starting characteristic polarization curve $P_N(I)$ and a limit characteristic polarization curve $P_G(I)$. With respect to the function values for the same current values, the limit characteristic polarization curve $P_G(I)$ is situated below the starting characteristic polarization curve $P_N(I)$. In addition, a point representing a pair of measured current and voltage values $I_{actual}$, $U_{actual}$ (determined at the outputs of the fuel cell unit) is entered.

The course of the characteristic polarization curve (and thus the value of the output voltage associated with a particular current value) is a function of a plurality of system quantities and environmental quantities ("influence quantities"). Among other things, these influence quantities include the temperature of the fuel cell unit (the so-called stack temperature) and the system pressure drop over the fuel cell unit or existing within the fuel cell unit. In order to minimize or compensate the influence of these influence quantities on the measured current/voltage values, the determination (preferably by a measuring and/or an estimation by means of an observer) of the measured current values and of the measured voltage values preferably takes place at defined working points at which the building-up transients have decayed and the measured values have a largely stationary behavior. Building-up transients are typically characterized by a high dynamic behavior.

If the system quantities and environmental quantities are within defined ranges and/or the conditions have been met for a sufficient decaying of the building-up transients, a pair of measured values $I_{actual}$, $U_{actual}$ can be determined and can be related to the course of the limit characteristic polarization curve. The starting characteristic polarization curve $P_N(I)$ and the limit characteristic polarization curve $P_G(I)$ have preferably been determined and defined beforehand (for example, by an empirical detection of the required data during experiments and tests on a test stand or within a test environment), and filed in an analyzing unit (for example, a control unit). Particularly the starting characteristic polarization curve $P_N(I)$ can be determined by a reference drive in the new condition or after the servicing/maintenance of the fuel cell unit.

The measured voltage value $U_{actual}$, which is assigned to the measured current value $I_{actual}$, is compared with the value $P_G(I_{actual})$ of the limit characteristic polarization curve $P_G(I)$ which is also assigned to the measured current value ($I_{actual}$). The comparison preferably takes place by the determination of the distance $\Delta U_2$ between the two values, the distance than being defined as the difference between the values:

$$\Delta U_2 = U_{actual} - P_G(I_{actual}).$$

According to a preferred embodiment of the invention, the measured voltage value $U_{actual}$, which is assigned to the measured current value $I_{actual}$, is also compared with the value $P_N(I_{actual})$ of the starting characteristic polarization curve $P_N(I)$, which is also assigned to the measured current value $I_{actual}$. The comparison preferably also takes place by the determination of the distance $\Delta U_1$ between the two values, the distance being defined as the difference between the values:

$$\Delta U_1 = U_{actual} - P_N(I_{actual}).$$

A normalized distance value $a_{norm}$ can be formed in that the distance $\Delta U_2$ of the measured voltage value $U_{actual}$ to the limit characteristic polarization curve $P_G(I)$ at the current value $I_{actual}$ is divided by the distance from the starting characteristic polarization curve $P_N(I)$ to the limit characteristic polarization curve $P_G(I)$ at the current value $I_{actual}$:

$$a_{norm} = \Delta U_2 / (\Delta U_1 + (\Delta U_2)) = (U_{actual} - P_G(I_{actual})) / (P_N(I$$

The normalization has the advantage that the magnitudes of the operandi remain small and undesirable scaling effects can be avoided. Furthermore, as a result of the normalization, the non-constant difference between the polarization curves ($dP(I_{actual}) = P_N(I_{actual}) - P_G(I_{actual})$) is compensated.

For the cases in which the measured voltage value $U_{actual}$ exceeds or falls below the corresponding values of the starting characteristic polarization curve $P_N(I)$ or of the limit characteristic polarization curve $P_G(I)$ for the current value $I_{actual}$, the normalized distance $a_{norm}$ is preferably limited as follows while forming the normalized or possibly limited distance a:

$$a = \begin{cases} 1 & \text{if } a_{norm} > 1 \\ a_{norm} & \text{otherwise} \end{cases}$$

Thus, if the normalized distance $a_{norm}$ exceeds the value 1, it is limited to one. The normalized distance $a_{norm}$ and the normalized and possibly limited distance a are each functions of the measured voltage value $U_{actual}$.

If the value of the distance a is equal to the value 1, the measured voltage value $U_{actual}$ is situated directly on or above the starting characteristic polarization curve $P_N(I)$ and characterizes a proper fuel cell unit condition. If the value of the distance a is between the values zero and one, the measured voltage value $U_{actual}$ is also situated between the above-defined characteristic curves $P_N(I)$ and $P_G(I)$ for the current value $I_{actual}$ For the case that the value of the distance a is lower than or equal to the threshold value zero, a conclusion is drawn that the condition of the fuel cell unit is faulty.

Naturally, the measured voltage value $U_{actual}$ can also be used directly for judging the operating condition of the fuel cell unit. In this case, it is concluded that the condition of the fuel cell unit is faulty when the measured voltage value $U_{actual}$ is lower than the value $P_G(I_{actual})$ of the limit characteristic polarization curve $P_G(I)$ which is also assigned to the measured current value $I_{actual}$, or when the difference $\Delta U_2$ is smaller than or equal to the zero threshold value.

For reasons of simplicity, the following explanations will relate to the distance a. However, they can also be directly expanded to the measured voltage value $U_{actual}$) the difference $\Delta U_2$ and the normalized distance $a_{norm}$, in that, for example, a multiplication factor is provided in the following equations, which multiplication factor corresponds to the normalization quantity $(P_N(I_{actual})-P_G(I_{actual}))$, or in that an additive offset is taken into account.

Figure 4:
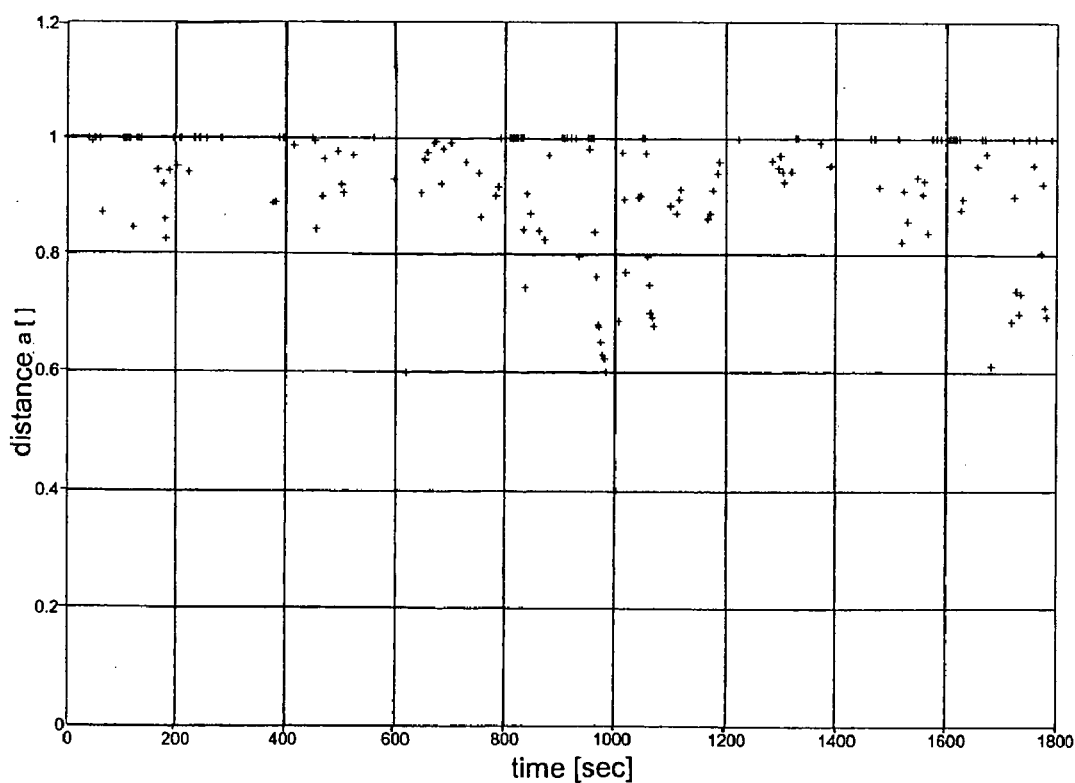
FIG. 4 is a graphic representation of determined distance values over the time.

FIG. 4 shows is a graphic representation of distance values a over the time t which, as described above, were computed from one measured voltage value $U_{actual}$ respectively. In this case, the measured voltage values were determined at different successive points in time which correspond to defined working points. The measured values are determined when the relevant system/environmental quantities are moving within defined ranges and/or the measured quantities have a stationary behavior. As a result, the measuring points in time can also not be equidistant. The determined distance values a correspond to a fuel cell unit which is in a good condition.

The following statistical values are obtained for the total time duration of the analysis: The mean value of the distance a is 0.92. The minimal distance value is at 0.60; the maximal distance value is at 1.00. Furthermore, there is a median of 0.96 and standard deviation of 0.10.

The distribution of the distance values and the low minimal distance value indicate that short-term artifacts may occur, for example, as a result of measuring errors, disturbances or reversible effects. However, the impairments and wear phenomena, for which the fuel cell is monitored, are long-term effects (irreversible effects) which can be forming for days or weeks. In order to counteract a falsification of the monitoring results caused by artifacts (for example, in the case of measured voltage values), according to a preferred embodiment, the distances a between the measured voltage value $U_{actual}$ and the limit value $P_G(I_{actual})$ of the limit characteristic polarization curve $P_G(I)$, which is also assigned to the measured current value $I_{actual}$, are formed at several successive points in time, so that a distance value a is assigned to each point in time. Then the average value z of the distance values a is formed. It is concluded that the condition of the fuel cell unit is faulty when this average value z is lower than or equal to a predefined threshold value, particularly zero. The average value is a function of the distance a. By forming the average value, aberrations and short-term deviations are advantageously smoothed.

In a particularly preferred embodiment, the average values z are determined by a sliding averaging over the time t:

$$z(t) = \frac{1}{\tau_1} \sum_{t'=t}^{t-\tau_1} a_i,$$

wherein the variable i is a counter. During the sliding averaging, only those distance values a are taken into account which are situated in the time window τ1 or in the time interval $t-\tau_1$, wherein t indicates the currently actual point in time. In addition or as an alternative, for example, the distance values can be weighted exponentially, in which case distance values which are situated farther back should be weighted lower during the computation.

The averaging is preferably implemented by means of a recursive method having a forget factor j, wherein $0 \leq j \leq 1$; a is the actual distance value; and a certain initial value is assigned to the condition $z_{old}$, such as zero:

$$z_{new} = j \cdot a + (1-j) \cdot z_{old}.$$

The sliding average value z(t) over time is a function of the distance a and describes the technical condition of the fuel cell unit. In the following, the sliding average value z(t) is therefore also called a condition z(t) of the fuel cell unit. If the sliding average value z(t) is at or below a predefined threshold value or a predefined threshold curve, it can be concluded that the condition of the fuel cell unit is faulty.

The selection of the length of the time window $\tau_1$ can influence the stability of the sliding average value z(t) with respect to artifacts and short-term deviations. The longer the time window $\tau_1$ is, the less the influence of artifacts and short-term deviations on the average value z(t).

Figure 5:
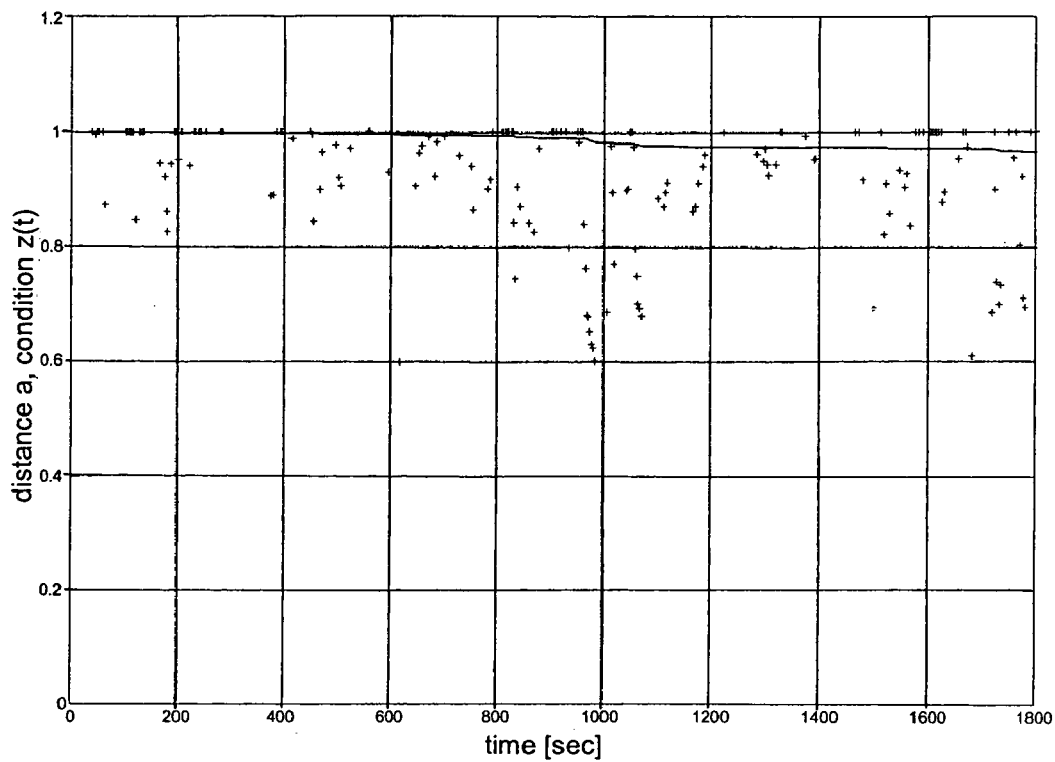
FIG. 5 is a graphic representation of distance values and function values of a sliding average value formation of the distance values over the time.

In FIG. 5, the distance values a illustrated in FIG. 4 are again entered over the time. In addition, the sliding average z(t) is illustrated which is determined by means of these distance values a. The starting or new condition of the fuel cell unit is given at z=1, while damage has occurred at z=0.

When the fuel cell unit in a motor vehicle is used for the power supply, the condition of the fuel cell unit can be determined according to the above equations and explanations directly from the data available in the motor vehicle.

The determination of the condition z(t) of the fuel cell unit is preferably followed by a method for determining a residual operating duration and/or of the residual operating path of the fuel cell unit. This method for determining the residual operating duration and/or the residual operating path (also called a prediction method) determines the residual operating duration and/or the residual operating path from the time history of the condition z(t). In this case, the method of determining the residual operating duration and/or the residual operating path can preferably be based on the so-called prediction error method. The prediction of the residual operating duration or of the residual operating path increases the capability for planning the servicing and maintenance of the fuel cell unit.

Figure 6:
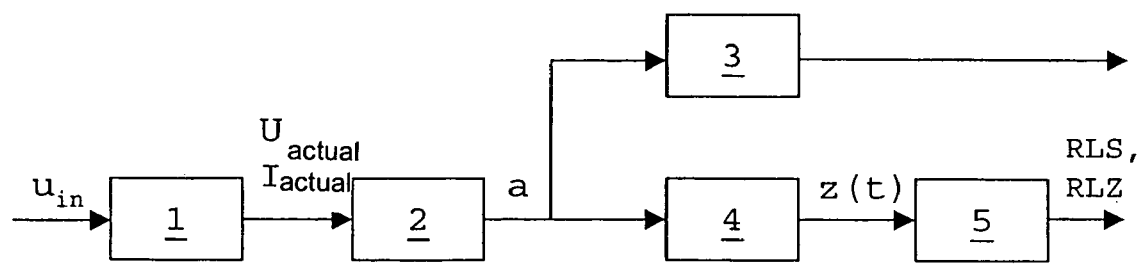
FIG. 6 is a block diagram of the method according to the invention.

FIG. 6 is a block diagram which illustrates schematically the method according to the invention for monitoring a fuel cell unit and for determining the residual operating duration/path. In a first function block 1, the system and/or environmental quantities $u_{in}$, which preferably also include the measured voltage and current values $U_{actual}$, $I_{actual}$, are analyzed and subjected to a preprocessing. During this preprocessing, the validity of the data, the validity of the working point, the stationary behavior of the determined quantities are checked. Furthermore, as required, a normalization takes place to the environmental data. In the case of a successful preprocessing (positive check), the measured voltage and current values $U_{actual}$, $I_{actual}$ are analyzed in a second position block 2 while computing the distance a. The distance a is supplied to a third function block 3 which analyzes the distance a, and carries out a fault detection. In the event that it is concluded that the condition of the fuel cell unit is faulty (see above), it emits a warning, and/or possibly shuts off the fuel cell unit. If a faulty condition of the fuel cell unit is detected or diagnosed, an alarm is preferably triggered, for example, by means of a corresponding acoustic or visual signal.

In a fourth function block 4, an averaging of the distance a is carried out while the condition z(t) is determined.

Naturally, the fault detection carried out in function block 3 may also be based on condition z(t). In a fifth function block 5, by means of the condition z(t), a prediction is made concerning the residual running time RLZ and/or the residual running path RLS of the fuel cell unit.

According to another preferred embodiment, the distance a is determined for several successive points in time within a certain time horizon which is larger than or equal to a predefined time interval $\tau_2$. The determined distance values are further subjected to a frequency analysis during which it is determined how many distance values a in the time interval $\tau_2$ are smaller than or equal to a predefined threshold value $a_{threshold}$. Here, the frequency h is preferably obtained from the ratio of the number $n_{a<athreshold}$ of the distance values a, which are smaller than or equal to the threshold value $a_{threshold}$, to the total number $n_{total}$ of the distance values:

$$h = n_{a<athreshold}/n_{total}.$$

If the frequency h exceeds a defined threshold frequency $h_{max}$, it is concluded that the condition of the fuel cell unit is faulty. Advantageously, the time interval $\tau_2$ may be selected to be significantly shorter than the time interval $\tau_2$ during the above-described sliding averaging. Accordingly, based on the frequency analysis, a deterioration of the operating characteristics of the fuel cell unit can be determined very rapidly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method of detecting deterioration of a fuel cell unit, comprising:
   determining at least one pair of measured values comprising a measured current value and a measured voltage value at the outputs of the fuel cell unit;
   comparing the measured voltage value with a limit value; and
   drawing a conclusion that the fuel cell unit is faulty when a difference between i) a function of the measured voltage value and ii) said limit value is less than or equal to a predefined threshold value; wherein,
   the limit value is a function of the measured current value; and
   a functional relationship between the limit value and the measured current value is given by a limit characteristic polarization curve of the fuel cell unit, which curve is indicative of an incipient faulty condition of said fuel cell unit.

2. The method according to claim 1, wherein:
   the measured voltage value is additionally compared with a starting value which is a function of the measured current value; and
   a functional relationship between the starting value and the measured current value is determined based on a starting characteristic polarization curve of the fuel cell unit, which curve is representative of a new condition of the fuel cell.

3. The method according to claim 1, wherein:
   a distance (a) is formed between the measured voltage value and the limit value; and
   it is concluded that the condition of the fuel cell unit is faulty when a function of the distance (a) is smaller than or equal to a predefined threshold value.

4. The method according to claim 2, wherein:
   a distance (a) is formed between the measured voltage value and the limit value; and
   it is concluded that the condition of the fuel cell unit is faulty when a function of the distance (a) is smaller than or equal to a predefined threshold value.

5. The method according to claim 3, wherein the difference is normalized for forming the distance (a).

6. The method according to claim 4, wherein the difference is normalized for forming the distance (a).

7. The method according to claim 3, wherein:
   the distance (a) between the measured voltage value and the limit value is determined at each of a plurality of successive points in time;
   an average value (z) of the determined distances (a) is formed; and
   it is concluded that the condition of the fuel cell unit is faulty when the average value (z) of the distances (a) is smaller than or equal to a predefined threshold value.

8. The method according to claim 5, wherein:
   the distance (a) between the measured voltage value and the limit value is determined at each of a plurality of successive points in time;
   an average value (z) of the determined distances (a) is formed; and
   it is concluded that the condition of the fuel cell unit is faulty when the average value (z) of the distances (a) is smaller than or equal to a predefined threshold value.

9. The method according to claim 7, wherein the averaging is performed in a sliding manner over a defined time interval.

10. The method according to claim 8, wherein the averaging is performed in a sliding manner over a defined time interval.

11. The method according to claim 7, wherein as a function of the time history of the average value (z), a prediction is made concerning at least one of a residual operating duration and a residual operating path of the fuel cell unit.

12. The method according to claim 10, wherein as a function of the time history of the average value (z), a prediction is made concerning at least one of a residual operating duration and a residual operating path of the fuel cell unit.

13. The method according to claim 3, wherein:
   the distance (a) is determined at each of a plurality of successive points in time within a defined time interval; and
   it is concluded that a condition of the fuel cell unit is faulty only when a function of the distance values (a) is smaller than or equal to a predefined threshold value with a frequency which exceeds a defined threshold frequency.

14. The method according to claim 5, wherein:
   the distance (a) is determined at each of a plurality of successive points in time within a defined time interval; and
   it is concluded that a condition of the fuel cell unit is faulty only when a function of the distance values (a) is smaller than or equal to a predefined threshold value with a frequency which exceeds a defined threshold frequency.

15. The method according to claim 1, wherein said function of said measured voltage value is equal to said voltage value.

16. The method according to claim 3, wherein said function of the distance (a) is equal to the distance (a).

17. The method according to claim 4, wherein said function of the distance (a) is equal to the distance (a).

18. The method according to claim 13, wherein said function of the distance values (a) is equal to the distance values (a).

19. The method according to claim 14, wherein said function of the distance values (a) is equal to the distance values (a).

* * * * *